W. DOUGALL.
READING RIBBON IN SIGNALING MACHINES.
APPLICATION FILED MAR. 13, 1920.

1,422,842.

Patented July 18, 1922.

INVENTOR
W. Dougall
BY C.J. Fetherstonhaugh
ATTORNEY

UNITED STATES PATENT OFFICE.

WILFRID DOUGALL, OF MONTREAL, QUEBEC, CANADA.

READING RIBBON IN SIGNALING MACHINES.

1,422,842.  Specification of Letters Patent.  Patented July 18, 1922.

Application filed March 13, 1920. Serial No. 365,648.

*To all whom it may concern:*

Be it known that I, WILFRID DOUGALL, a subject of the King of Great Britain, and residing at 251 Hutchison Street, in the city and District of Montreal, in the Province of Quebec, in the Dominion of Canada, have invented a new and useful Reading Ribbon in Signaling Machines, of which the following is the specification.

The invention relates to a reading ribbon in signaling machines, as described in the present specification and illustrated in the accompanying drawings that form part of the same.

The invention consists essentially in the novel form of the ribbon subsequent to marking or punching the same, whereby said ribbon in passing through a machine will control the signals transmitted therefrom in accordance with the said markings or punchings.

The objects of the invention are, primarily, to assist the blind towards reading books and text of all kinds, thereby facilitating their education, as well as affording amusement and healthful occupation; to devise a means of communicating text to the mind for use in various and sundry places; to eliminate all complications in the operations of machines made for the purpose of signaling with this ribbon; to furnish a simple make and break member for the electric operation of transmitting machines; and generally to provide a simple and efficient reader that will be intelligible and of quick understanding.

In the drawings, Figure 1 is a perspective view showing a roll of this ribbon partly unwound.

Like numerals of reference indicate corresponding parts in each figure.

Figure 1:
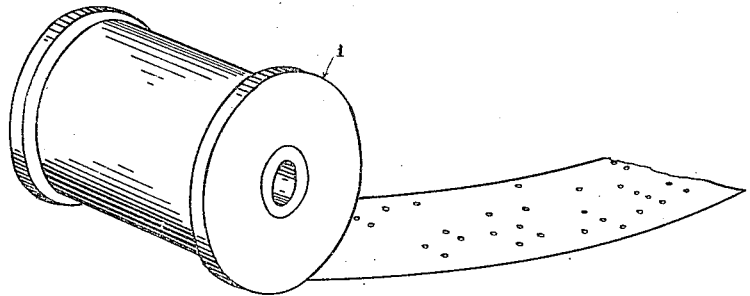

This invention is in reality a reader for the blind, and where the text to be read comprises a book, which may be a story, poems, a religious work, a technical work, or other reading matter, the whole book may be contained in a single roll, so the reading of such roll is preferably forward and return taking one longitudinal half one way, and the remaining half the other way, thereby furnishing in one roll a convenient book-roll, from which rolls the signals are easily transmitted by pulsatile signal members operated by electrical members for touch reading as explained more fully in a copending application Serial No. 365,647 filed March 13th, 1920. The signals used to denote the words or letters may be made up in many styles of alphabets or sounds, and no doubt will conform always to the idiosyncrasies of the language to be interpreted. In the present description the phonetical interpretation is taken, but this does not form an essential part of the invention.

Referring to the drawings, the numeral 1 indicates a roll, preferably of paper in ribbon form, which is made of a useful width to suit this invention. This paper is divided longitudinally into two longitudinal widths 2 and 3, the width 2 representing the beginning of the book, that is, the first half of it, and the width 3 representing the finishing of a book, that is to say, the second half of it.

Each longitudinal half is preferably transversely perforated as shown by the holes in groups 4 and singles 5. The groups and singles in the perforations may be in either the left hand subdivision 6 or the right hand subdivision 7 of the longitudinal halves 2 and 3, and further it is not actually necessary under some conditions to perforate the paper.

These perforations or other means of communicating by means of the paper, are made first along the longitudinal half 2, in successive transverse rows 8, which for the better understanding are shown in one view as ruled across, though of course such ruling will not be on the punched roll.

The successive transverse rows are continued on the one side of the ribbon until approximately one-half the book or other work has been transformed to the sign language then the transverse rows are made along the other side preferably from the finishing end of the first side so that the book or work or part thereof is completed at or about the starting point but on the other longitudinal half.

Figure 3:
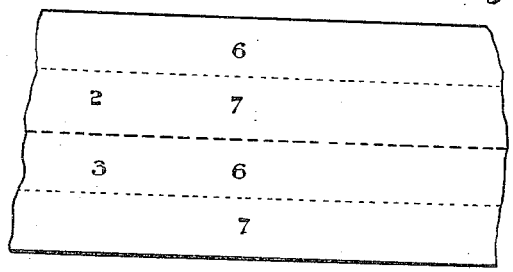
Figure 3 is a fragmentary view of the ribbon showing by dotted lines the division of the ribbon as marked or perforated.
Figure 2:
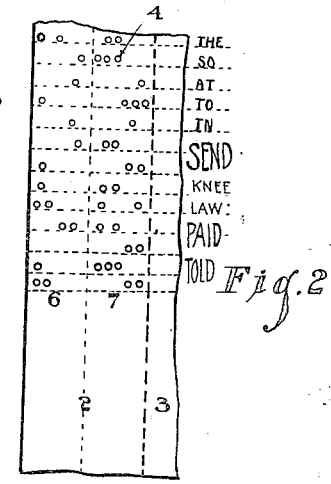
Figure 2 is a detail showing a fragmentary portion of the ribbon giving an example as to how it is made up.
Figure 4:
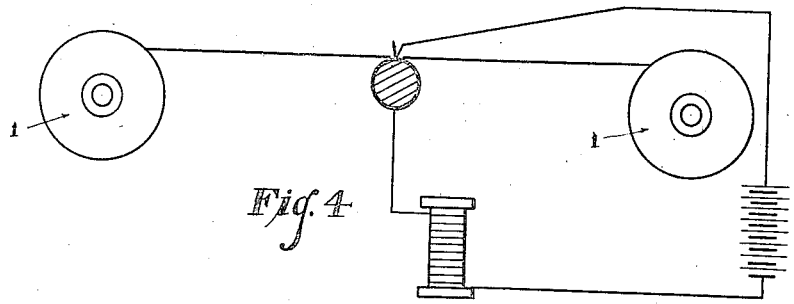
Figure 4 is a view showing the ribbon passing through the electric apparatus as a make and break member.

This completes the ribbon, which is then turned into an efficient make and break member for operating between switch electric terminals adapted to complete the circuit through the holes punched in the ribbon as shown in Figure 3 and by this means convey the signals through a solenoid or other electrical device.

In transferring the signals denoted by the perforations or other stampings in this ribbon, a transmitting machine is used in which electric circuits are opened and closed as the ribbon passes along, the said ribbon passing terminals, which are so arranged that no matter where a hole may occur in the ribbon, the circuit will at once be closed and an electric device operated which may operate a signal in any suitable manner according to the type of apparatus that is to be used.

It must be understood that in this ribbon, the precise marking or punching as shown is not by any means essential, as many departures may be made without altering the spirit of the invention, especially is this so in adapting the ribbon to languages other than English and French, and so long as the changes in its preparation are within the scope of the claims for novelty following, the protection accorded shall not be invalidated.

What I claim is:—

1. In a reading ribbon, a length of sheet material punched with short rows of holes extending approximately half way across the ribbon and successively arranged and further transverse rows of holes on the other longitudinal half of the ribbon forming a continuation of the signal holes denoting the text from the first longitudinal half.

2. In a reading ribbon, a roll of paper in ribbon form punched with holes and forming two longitudinal halves, the reading matter beginning on the one half and continuing along the other from the finish of the first and completing the subject matter in hand.

3. In a reading ribbon a roll of paper in ribbon form punched with holes in successive transverse rows along one longitudinal half of the ribbon and back along the other half, the reading matter finishing on the second longitudinal half at approximately the starting place of the first half.

4. A reading ribbon comprising a length of sheet material in ribbon form divided longitudinally on an imaginary line in two equal parts and subdivided longitudinally into left and right hand divisions in each longitudinal half, the said longitudinal halves having perforations in transverse arrangement for left and right hands in groups or singly, these perforations continuing in successive lines along one longitudinal half and back by the other finishing at or about the starting point and completing a book roll.

Signed at the city of Montreal in the Province of Quebec in the Dominion of Canada this 8th day of March 1920.

WILFRID DOUGALL.